United States Patent
Ishida et al.

(10) Patent No.: US 7,936,367 B2
(45) Date of Patent: May 3, 2011

(54) IMAGE FORMING APPARATUS CONTROLLING THE OUTPUT LEVEL OF THE LIGHT SOURCE

(75) Inventors: Masaaki Ishida, Kanagawa (JP); Yasuhiro Nihei, Kanagawa (JP); Atsufumi Omori, Kanagawa (JP); Dan Ozasa, Kanagawa (JP); Jun Tanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 74 days.

(21) Appl. No.: 12/341,332

(22) Filed: Dec. 22, 2008

(65) Prior Publication Data

US 2009/0167837 A1    Jul. 2, 2009

(30) Foreign Application Priority Data

Dec. 26, 2007   (JP) .................... 2007-333672

(51) Int. Cl.
    *B41J 2/435* (2006.01)
(52) U.S. Cl. ...................... 347/236; 347/246
(58) Field of Classification Search .......... 347/234–237, 347/246–250
    See application file for complete search history.

(56) References Cited

U.S. PATENT DOCUMENTS

| | | | |
|---|---|---|---|
| 5,453,851 A * | 9/1995 | Faulhaber | 358/481 |
| 6,791,596 B2 | 9/2004 | Nihei et al. | |
| 6,927,789 B2 | 8/2005 | Ozasa et al. | |
| 6,933,957 B2 | 8/2005 | Omori et al. | |
| 7,212,224 B2 | 5/2007 | Nihei et a | |
| 7,256,815 B2 | 8/2007 | Suzuki et al. | |
| 7,271,824 B2 | 9/2007 | Omori et al. | |
| 7,283,151 B2 | 10/2007 | Nihei et al. | |
| 7,327,379 B2 | 2/2008 | Nihei et al. | |
| 7,456,856 B2 | 11/2008 | Nihei | |
| 7,589,756 B2 * | 9/2009 | Matsumae et al. | 347/241 |
| 2005/0089069 A1 | 4/2005 | Ozasa et al. | |
| 2005/0219354 A1 | 10/2005 | Omori et al. | |
| 2005/0243163 A1 | 11/2005 | Ozasa et al. | |
| 2006/0285186 A1 | 12/2006 | Ishida et al. | |
| 2007/0030548 A1 | 2/2007 | Nihei et al. | |
| 2007/0091163 A1 | 4/2007 | Omori et al. | |
| 2007/0126517 A1 | 6/2007 | Ozasa | |
| 2007/0132828 A1 | 6/2007 | Ishida et al. | |
| 2007/0206234 A1 | 9/2007 | Ozasa et al. | |
| 2007/0253047 A1 * | 11/2007 | Ichii et al. | 359/204 |
| 2008/0088893 A1 | 4/2008 | Ishida et al. | |
| 2008/0123160 A1 | 5/2008 | Omori et al. | |
| 2008/0218813 A1 | 9/2008 | Tanabe et al. | |
| 2008/0225106 A1 | 9/2008 | Omori et al. | |
| 2008/0239336 A1 | 10/2008 | Tanabe et al. | |

(Continued)

FOREIGN PATENT DOCUMENTS

JP    4-321370    11/1992

(Continued)

*Primary Examiner* — Hai C Pham
(74) *Attorney, Agent, or Firm* — Dickstein Shapiro LLP

(57) ABSTRACT

An image forming apparatus includes an optical scanning device that scans a scan area on an image carrier with light flux containing image information and writes the image information onto an image area in the scan area. In the optical scanning device, a first light receiving unit receives light flux emitted from a light source and reflected by a reflecting optical unit; a second light receiving unit receives light flux that passes through an aperture of the reflecting optical unit, is deflected by a deflecting unit, and heads for outside the image area within the scan area; and a control unit controls a drive signal of the light source based on signals output from the first and second light receiving units.

21 Claims, 16 Drawing Sheets

U.S. PATENT DOCUMENTS

2008/0284838 A1   11/2008   Suzuki et al.
2008/0291259 A1   11/2008   Nihei et al.

FOREIGN PATENT DOCUMENTS

| | | |
|---|---|---|
| JP | 9-288244 | 11/1997 |
| JP | 2002-26445 | 1/2002 |
| JP | 2002-40350 | 2/2002 |
| JP | 2005-37575 | 2/2005 |
| JP | 2005037575 A * | 2/2005 |
| JP | 2005-274678 | 10/2005 |
| JP | 2007-298563 | 11/2007 |

* cited by examiner

D1 > D2

IMAGE FORMING APPARATUS CONTROLLING THE OUTPUT LEVEL OF THE LIGHT SOURCE

CROSS-REFERENCE TO RELATED APPLICATIONS

The present application claims priority to and incorporates by reference the entire contents of Japanese priority document 2007-333672 filed in Japan on Dec. 26, 2007.

BACKGROUND OF THE INVENTION

1. Field of the Invention

The present invention relates to an image forming apparatus including an optical scanning device.

2. Description of the Related Art

In electrophotography image recording, an image forming apparatus using laser light is widely used. In this case, the image forming apparatus generally includes an optical scanning device, and forms a latent image on a surface of a drum-shaped photosensitive element by scanning the photosensitive element with a light flux output from a light source in an axial direction of the photosensitive element using a deflector (for example, a polygon mirror) while rotating the photosensitive element.

In the image forming apparatus, the light amount of scanning light may change due to a change in temperature or an elapse of time, and density unevenness may occur in an image. To suppress this, in a general optical scanning device, a part of light output from a light source is received by a detector such as a photo diode as a light flux for monitoring, and auto power control (APC) for controlling the output level of the light source is performed based on the result (see for example Japanese Patent Application Laid-open No. H9-288244, Japanese Patent Application Laid-open No. 2002-40350, and Japanese Patent Application Laid-open No. H4-321370).

However, a demand for capability of forming a higher quality image of an image forming apparatus is growing. Therefore, the apparatus disclosed in Japanese Patent Application Laid-open No. H9-288244, Japanese Patent Application Laid-open No. 2002-40350, and Japanese Patent Application Laid-open No. H4-321370 will not provide sufficiently accurate APC control, therefore it will be difficult for the apparatus to meet the demand.

SUMMARY OF THE INVENTION

It is an object of the present invention to at least partially solve the problems in the conventional technology.

According to an aspect of the present invention, an image forming apparatus includes at least one image carrier on which an image is formed; and an optical scanning device that scans a scan area on the image carrier with a light flux containing image information and writes the image information onto an image area in the scan area, and that includes a light source that emits a light flux; a reflecting optical unit that has an aperture through a substantial center of which a first light flux of the light flux having the highest light intensity passes, and that reflects a second light flux of the light flux incident on a periphery of the aperture; a first light receiving unit that receives the second light flux reflected by the reflecting optical unit; a deflecting unit that deflects the first light flux having passed through the aperture; a scanning optical unit that converges the first light flux deflected by the deflecting unit on the image carrier; a second light receiving unit that receives a part of the first light flux deflected by the deflecting unit and heading for outside the image area within the scan area; and a control unit that controls a drive signal of the light source based on a signal output from the first light receiving unit and a signal output from the second light receiving unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
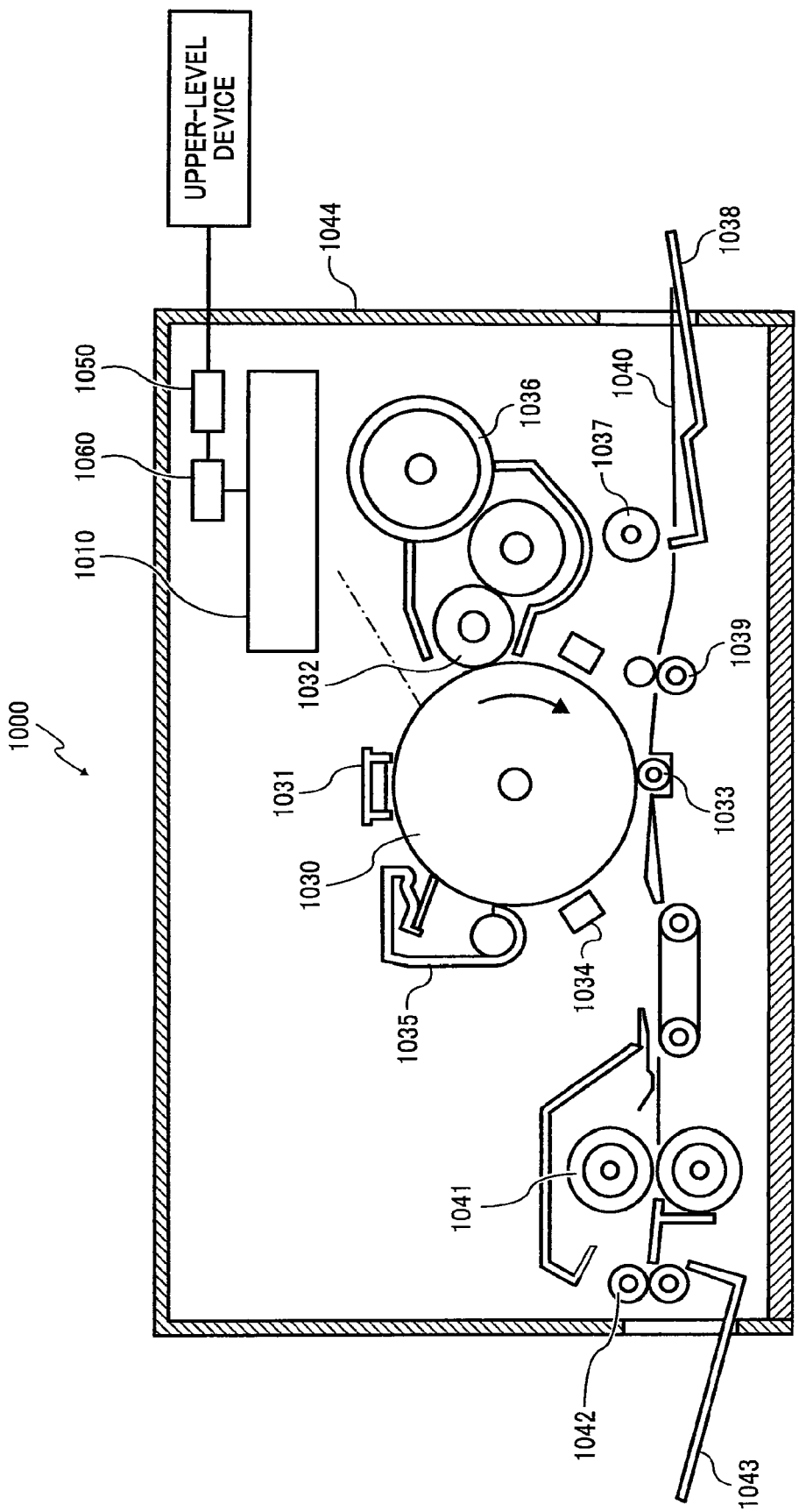
FIG. 1 is a schematic diagram of a configuration of a laser printer according to an embodiment of the present invention.

FIG. 1 is a schematic diagram of a configuration of a laser printer 1000 as an image forming apparatus according to an embodiment of the present invention.

The laser printer 1000 includes an optical scanning device 1010, a photosensitive element 1030, a charging unit 1031, a developing roller 1032, a transfer charging unit 1033, a neutralizing unit 1034, a cleaning unit 1035, a toner cartridge 1036, a sheet feeding roller 1037, a sheet feed tray 1038, a pair of registration rollers 1039, a fixing roller 1041, a sheet discharge roller 1042, a sheet receiving tray 1043, a communication control device 1050, a printer control device 1060 that controls each of the above units comprehensively, and the like. These units are disposed at predetermined positions in a printer housing 1044.

The communication control device 1050 controls interactive communication with upper-level devices (personal computers, for example) through network.

The photosensitive element 1030 is a cylindrical member, and has on its surface a photosensitive layer. In other words, the surface of the photosensitive element 1030 is a surface to be scanned. The photosensitive element 1030 rotates in the direction of an arrow shown in FIG. 1.

The charging unit 1031, the developing roller 1032, the transfer charging unit 1033, the neutralizing unit 1034, and the cleaning unit 1035 are arranged near the surface of the photosensitive element 1030. Along the rotation direction of the photosensitive element 1030, the charging unit 1031, the developing roller 1032, the transfer charging unit 1033, the neutralizing unit 1034, and the cleaning unit 1035 are arranged in this order.

The charging unit 1031 charges the surface of the photosensitive element 1030 uniformly.

The optical scanning device 1010 irradiates the charged surface of the photosensitive element 1030 with a light flux modulated based on image information from an upper-level device. Accordingly, a latent image corresponding to the image information is formed on the surface of the photosensitive element 1030. The formed latent image moves towards the developing roller 1032 along with the rotation of the photosensitive element 1030. The configuration of the optical scanning device 1010 is explained later.

The toner cartridge 1036 contains toner, and the toner is supplied to the developing roller 1032.

The developing roller 1032 causes the toner supplied from the toner cartridge 1036 to adhere to a latent image formed on the surface of the photosensitive element 1030, thereby forming a toner image based on the image information. The toner image moves towards the transfer charging unit 1033 along with the rotation of the photosensitive element 1030.

The sheet feed tray 1038 stores therein recording media (hereinafter, "recording sheets") 1040. The sheet feeding roller 1037 is arranged near the sheet feed tray 1038, and the sheet feeding roller 1037 takes out the recording sheets 1040 one by one from the sheet feed tray 1038, and supplies the recording sheet 1040 to the registration rollers 1039. The registration rollers 1039 temporarily hold the recording sheet 1040 taken out by the sheet feeding roller 1037, and send out the recording sheet 1040 to a nip between the photosensitive element 1030 and the transfer, charging unit 1033 along with the rotation of the photosensitive element 1030.

In order to electrically attract toner on the surface of the photosensitive element 1030 to the recording sheet 1040, voltage having a polarity opposite to the toner is applied to the transfer charging unit 1033. With this voltage, the toner image on the surface of the photosensitive element 1030 is transferred onto the recording sheet 1040. The recording sheet 1040 onto which the toner image has been transferred is sent to the fixing roller 1041.

At the fixing roller 1041, heat and pressure is applied to the recording sheet 1040, and thus, the toner image on the recording sheet 1040 is fixed thereon. The recording sheet 1040 with the toner image fixed is conveyed to the sheet receiving tray 1043 through the sheet discharge roller 1042, and is stacked sequentially on the sheet receiving tray 1043.

The neutralizing unit 1034 neutralizes the surface of the photosensitive element 1030.

The cleaning unit 1035 removes toner (residual toner) remained on the surface of the photosensitive element 1030. The surface of the photosensitive element 1030 with no residual toner remained returns again to the position at which the surface faces the charging unit 1031.

The configuration of the optical scanning device 1010 is now explained.

Figure 2:
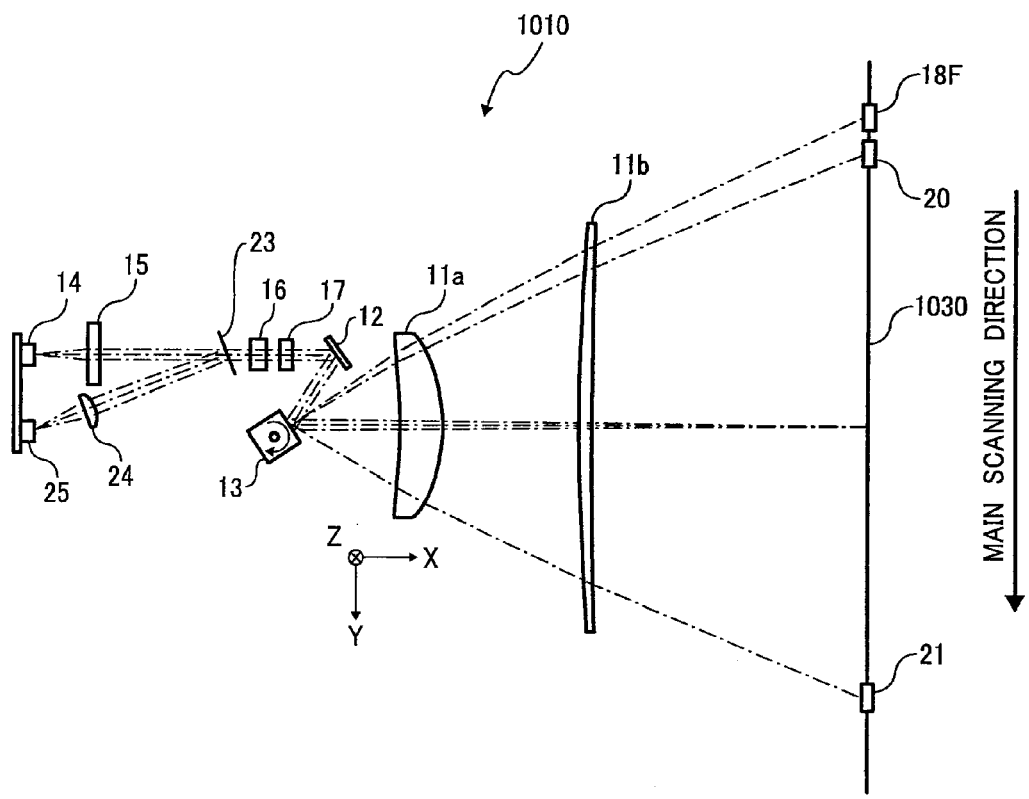
FIG. 2 is a schematic diagram of the optical scanning device of the laser printer.

As shown in FIG. 2 as an example, the optical scanning device 1010 includes a deflector-side scanning lens 11a, an image-surface-side scanning lens 11b, a polygon mirror 13, a light source 14, a coupling lens 15, a liquid crystal deflecting element 16, a cylindrical lens 17, a reflection mirror 12, a forward synchronization detecting sensor 18F, an APC light receiving unit 20, a beam detecting sensor 21, a scanning control unit 22 (not shown in FIG. 2, see FIG. 11), an aperture plate 23, an imaging lens 24, and a photo diode 25. In this specification, the XYZ three-dimensional Cartesian coordinate system has the Y-axis in the direction along the longitudinal direction of the photosensitive element 1030, and the X-axis in the direction along the optical axis of each of the scanning lenses 11a and 11b.

Figure 3:
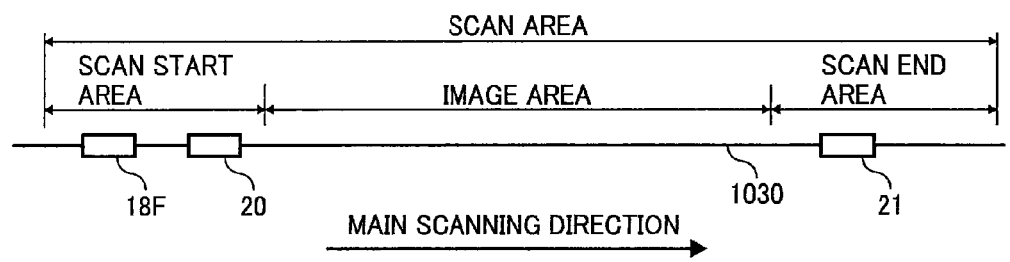
FIG. 3 is a schematic diagram for explaining a scan start area, an image area, and a scan end area.

An area that is on the surface of the photosensitive element 1030 and is optically scanned in the Y-axis direction by the optical scanning device 1010 is called a scan area (see FIG. 3). A part of the scan area onto which image information is written is called an image area (see FIG. 3). In the present embodiment, a part of the scan area that is scanned before the image area is scanned is called a scan start area for convenience, and a part of the scan area that is scanned after the image area is scanned is called a scan end area for convenience.

The forward synchronization detecting sensor 18F and the APC light receiving unit 20 are arranged in the scan start area, and the beam detecting sensor 21 is arranged in the scan end area.

The APC light receiving unit 20 is arranged closer to the image area than the forward synchronization detecting sensor 18F is.

Figure 4:
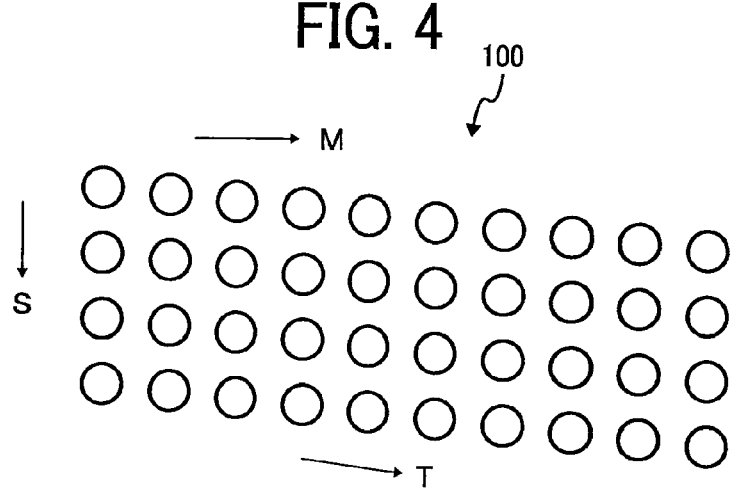
FIG. 4 is a schematic diagram for explaining a two dimensional array of VCSEL provided in a light source of the optical scanning device.

As shown in FIG. 4 as one example, the light source 14 includes a two-dimensional array 100 formed on a single substrate with 40 light emitting units arrayed two-dimensionally thereon. The M direction in FIG. 4 corresponds to the main scanning direction (same as the Y-axis direction), and the S direction corresponds to the sub-scanning direction (same as the Z-axis direction). The T direction is a direction to form an inclined angle a ($0°<\alpha<90°$) from the M direction toward the S direction.

The two-dimensional array 100 has four rows of the light emitting units, each row having ten light emitting units arranged at regular intervals in the T direction. The four light emitting unit rows are arranged at regular intervals in the S direction such that the intervals are equal when all the light emitting units are orthogonally projected on a virtual line extending in the S direction.

Each light emitting unit is a surface-emitting laser of a 780 nanometer band vertical resonator type (Vertical Cavity Surface Emitting Laser: VCSEL). In other words, the two-dimensional array 100 is a surface-emitting laser array having 40 light emitting units.

The coupling lens 15 makes the light flux output from the light source 14 substantially parallel.

Figure 5A:
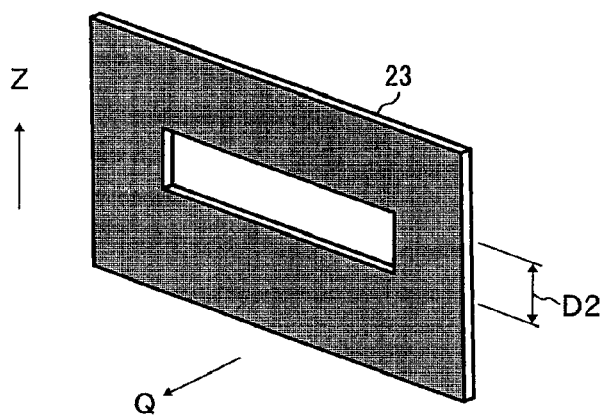
FIGS. 5A and 5B are schematic diagrams for explaining an aperture plate of the optical scanning device.

The aperture plate 23 has, for example as shown in FIG. 5A, an opening, and defines the beam diameter of the light flux having passed through the coupling lens 15. The aperture plate 23 is arranged such that a portion of the light flux having the highest light intensity passes the substantial center of the opening. The periphery of the opening of the aperture plate 23 is made of a reflective member.

Figure 5B:
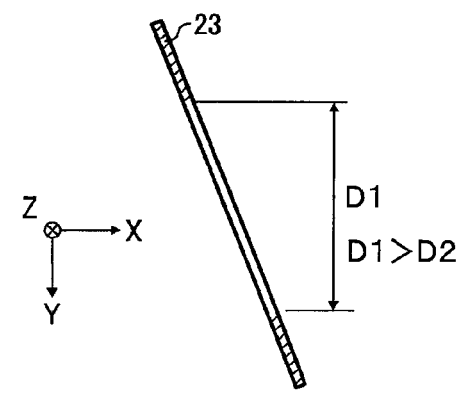
Figure 6:
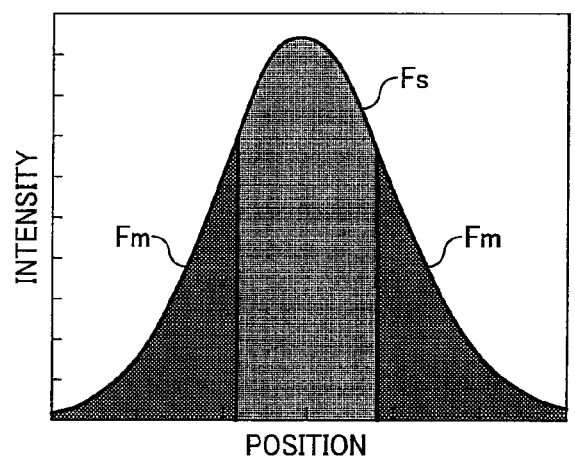
FIG. 6 is a graph for explaining the aperture plate.

The aperture plate 23 is, for example as shown in FIG. 5B, arranged obliquely to a virtual surface being vertical to the traveling direction of the light flux having passed through the coupling lens 15, in order to use the light flux reflected by the reflective member of the periphery of the opening as the light flux for monitoring. In other words, the aperture plate 23 allows the center portion having a high light intensity of among the light flux output from the light source 14 to pass through, (Fs in FIG. 6), and reflects (separates) the outer portion having a small light intensity (Fm in FIG. 6) as a light flux for monitoring. Hereinafter, the traveling direction of such reflected light flux for monitoring is called "the Q direction" for convenience.

As shown in FIGS. 5A and 5B, a length D2 of the opening of the aperture plate 23 in the direction (the Z-axis direction) corresponding to the sub-scanning direction is 1.28 millimeters, and a length D1 in the direction (the Y-axis direction) corresponding to the main scanning direction is 5.8 millimeters. FIG. 5B is an X-Y cross-sectional view through the center of the opening.

The liquid crystal deflecting element 16 is arranged on the light path of the light flux having passed through the opening of the aperture plate 23, and can deflect the incident light in the direction corresponding to the sub-scanning direction (the Z-axis direction) according to applied voltage.

The cylindrical lens 17 focuses the light flux having passed through the liquid crystal deflecting element 16, via the reflection mirror 12, near a deflection reflection surface of the polygon mirror 13 in the direction (the Z-axis direction) corresponding to the sub-scanning direction.

The optical system arranged on the light path between the light source 14 and the polygon mirror 13 is also called a pre-deflector optical system. In the present embodiment, the pre-deflector optical system includes the coupling lens 15, the aperture plate 23, the liquid crystal deflecting element 16, the cylindrical lens 17, and the reflection mirror 12.

The polygon mirror 13 includes, for example, a four-surface mirror with an incircle having a radius of 7 millimeters, and each mirror functions as a deflection reflection surface. The polygon mirror 13 deflects the light flux from the reflection mirror 12 while rotating at a constant speed around an axis placed parallel to the direction (the Z-axis direction) corresponding to the sub-scanning direction.

The deflector-side scanning lens 11a is arranged on the light path of the light flux deflected by the polygon mirror 13.

The image-surface-side scanning lens 11b is arranged on the light path of the light flux having passed through the deflector-side scanning lens 11a. The light flux having passed through the image-surface-side scanning lens 11b is applied on the surface of the photosensitive element 1030, and thus a light spot is formed. The light spot moves in the longitudinal direction of the photosensitive element 1030 along with the rotation of the polygon mirror 13. In other words, the photosensitive element 1030 is scanned. The direction of the movement of the light spot at this time is the main scanning direction.

The optical system arranged on the light path between the polygon mirror 13 and the photosensitive element 1030 is also called a scanning optical system. In the present embodiment, the scanning optical system includes the deflector-side scanning lens 11a and the image-surface-side scanning lens 11b.

The light flux reflected by the aperture plate 23 is received by the photo diode 25 after having passed through the imaging lens 24. The photo diode 25 outputs a signal (photoelectric conversion signal) according to the amount of the received light. The signal output from the photo diode 25 is used for APC control (hereinafter, also referred to as "a light amount monitoring signal" for convenience).

Of among the light flux deflected by the polygon mirror 13 and having passed through the scanning optical system, a part of the light flux heading for the scan start area enters the forward synchronization detecting sensor 18F and the APC light receiving unit 20.

Figure 7:
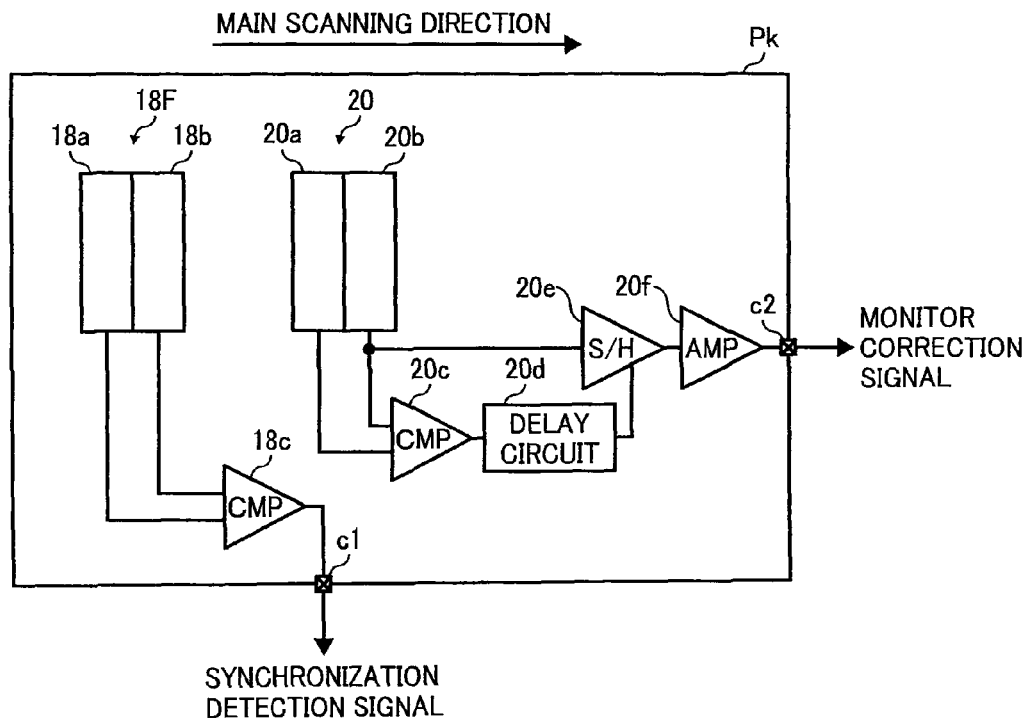
FIG. 7 is a schematic diagram for explaining a package housing an APC light receiving unit and a forward synchronization detecting sensor of the optical scanning device.

The forward synchronization detecting sensor 18F and the APC light receiving unit 20 are, for example as shown in FIG. 7, housed in the same package Pk. The package Pk also contains a comparator (CMP) 18c, a comparator (CMP) 20c, a delay circuit 20d, a sample-hold circuit (S/H) 20e, and an amplifier (AMP) 20f.

The forward synchronization detecting sensor 18F includes a dual-split light receiving element of a partial light receiving element 18a and a partial light receiving element 18b. A signal output from the partial light receiving element 18a, and a signal output from the partial light receiving element 18b are compared by the comparator 18c, and the result is output from a terminal c1 of the package Pk as a signal for synchronization detection (hereinafter, "synchronization detection signal").

The APC light receiving unit 20 includes a dual-split light receiving element composed of a partial light receiving element 20a and a partial light receiving element 20b. A signal output from the partial light receiving element 20a, and a signal output from the partial light receiving element 20b are compared by the comparator 20c, and the result is input to the delay circuit 20d. The signal output from the partial light receiving element 20b is input to the sample-hold circuit 20e, and the signal output from the delay circuit 20d is sampled and held as a sampling signal. The signal output from the sample-hold circuit 20e is amplified by the amplifier 20f, and then is output from a terminal c2 of the package Pk as a signal for monitor correction (hereinafter, "monitor correction signal").

Figure 8:
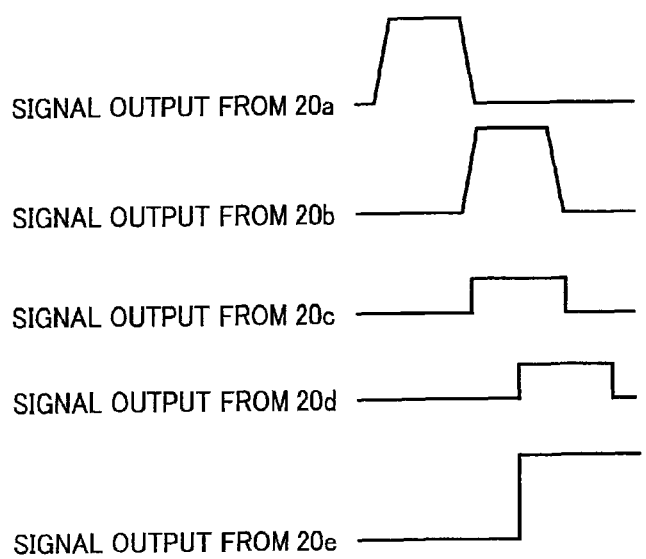
FIG. 8 is a timing chart for explaining operation performed by circuits that generate a monitor correction signal from a signal output from the APC light receiving unit.

FIG. 8 is a timing chart of a signal output from each of the partial light receiving elements 20a and 20b of the APC light receiving unit 20, a signal output from the comparator 20c, a signal output from the delay circuit 20d, and a signal output from the sample-hold circuit 20e.

Of among the light flux deflected by the polygon mirror 13 and having passed through the scanning optical system, a part of the light flux heading for the scan end area enters the beam detecting sensor 21.

Figure 9:
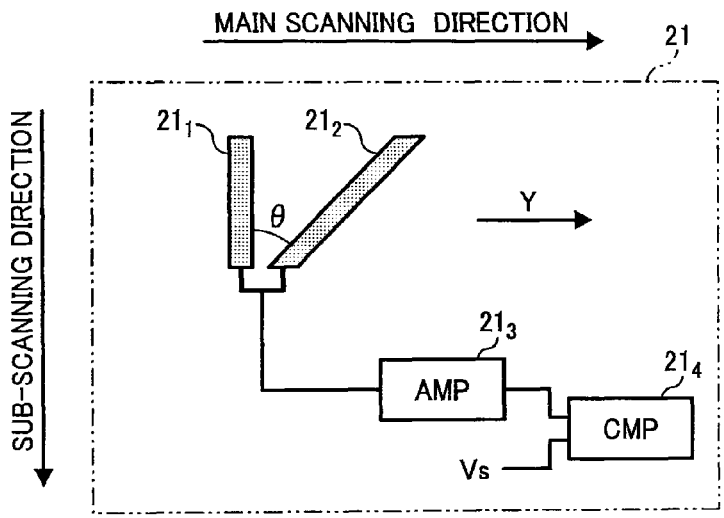
FIG. 9 is a schematic diagram for explaining a beam detecting sensor of the optical scanning device.

As shown in FIG. 9, the beam detecting sensor 21 includes a light receiving element having two light receiving units (a first light receiving unit $21_1$, and a second light receiving unit $21_2$), an amplifier (AMP) $21_3$ that amplifies a signal (photoelectric conversion signal) according to the amount of light received from the light receiving element, and a comparator (CMP) $21_4$ that compares a level of the signal output from the amplifier $21_3$ and a reference level Vs set in advance and outputs the result of comparison. The signal output from the comparator $21_4$ is supplied to the scanning control unit 22.

The intervals of the light receiving units $21_1$ and $21_2$ in the main scanning direction are different depending on a position in the sub-scanning direction.

The first light receiving unit $21_1$ for example has a rectangular shape, and is arranged such that its longitudinal direction coincides with the sub-scanning direction. In other words, two sides through which a light flux passes are orthogonal to the main scanning direction.

The second light receiving unit $21_2$ for example has a parallelogram shape, and is arranged on the +Y side of the first light receiving unit $21_1$. The longitudinal direction of the second light receiving unit $21_2$ is inclined to the longitudinal direction of the first light receiving unit $21_1$ in the light receiving plane by an angle θ (0<θ<90°). In other words, two sides through which a light flux passes are inclined to the main scanning direction and the sub-scanning direction.

The amplifier $21_3$ amplifies and inverts an input signal. Accordingly, the larger the amount of light received by each of the light receiving units $21_1$ and $21_2$ is, the lower the level of a signal output from the amplifier $21_3$ is.

The reference level Vs is set slightly higher than the level of a signal output from the $21_3$ (minimum value) when a light flux is received by each of the light receiving units $21_1$ and $21_2$. Therefore, when any one of the light receiving units $21_1$ and $21_2$ receives a light flux, the result of comparison by the comparator $21_4$ changes, and the signal output from the comparator $21_4$ changes accordingly.

Figure 10A:
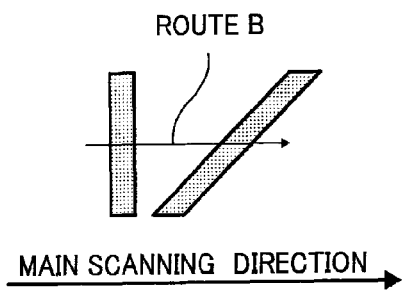
FIGS. 10A to 10D are schematic diagrams for explaining operations performed by the beam detecting sensor.

The beam detecting sensor 21 is adjusted such that when the incident position of the light flux on the surface of the photosensitive element 1030 is at the designed position, the light flux passes through the substantial center of each of the light receiving units $21_1$ and $21_2$ (see FIG. 10A). At this time, the time interval from detection of the light flux by the first light receiving unit $21_1$ to detection of the light flux by the second light receiving unit $21_2$ is obtained in advance as a reference time Ts (see FIG. 10B). The route of the incident position of a light flux in the beam detecting sensor 21 at this time, that is the route as designed, is termed "a route A" for convenience.

The light path of the light flux heading for the photosensitive element 1030 may deviate from the designed light path to the direction (the Z-axis direction) corresponding to the sub-scanning direction due to change in environmental temperature, or the like. In such a case, for example as shown in FIG. 10C, the route of the incident position of the light flux in the beam detecting sensor 21 also deviates from the route A to the sub-scanning direction. The route at this time is termed "a route B" for convenience.

A deviation amount Δh (see FIG. 10C) of the route at this time can be obtained from the following Equation 1. ΔT is a difference between a time T from a falling edge of a signal output from the comparator $21_4$ to the next falling edge and the reference time Ts (see FIG. 10D), and V is a moving speed (scanning speed) of a light flux. The deviation amount Δh has a correlation with a deviation amount of the light path of a light flux heading for photosensitive element 1030 from the designed light path in the sub-scanning direction.

$$\Delta h = (V/\tan\theta) \times \Delta T \quad (1)$$

Figure 10B:
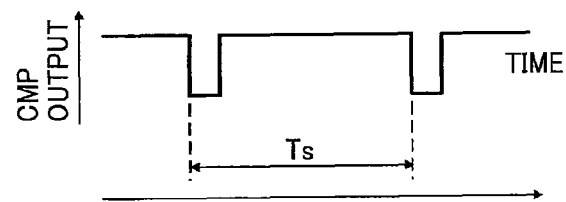
Figure 10C:
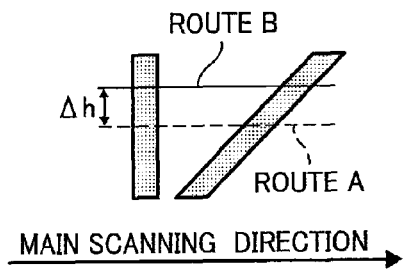
Figure 10D:
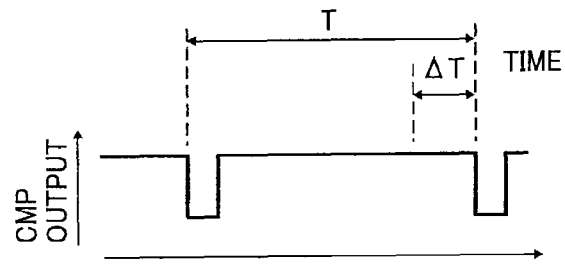

The falling edge timing of a signal output from the comparator $21_4$ when the first light receiving unit $21_1$ receives a light flux is not affected by an incident position of a light flux in the sub-scanning direction (see FIGS. 10B and 10D). Accordingly, the timing of scanning end can be obtained from a falling edge of a signal output from the comparator $21_4$ when the first light receiving unit $21_1$ receives a light flux.

Figure 11:
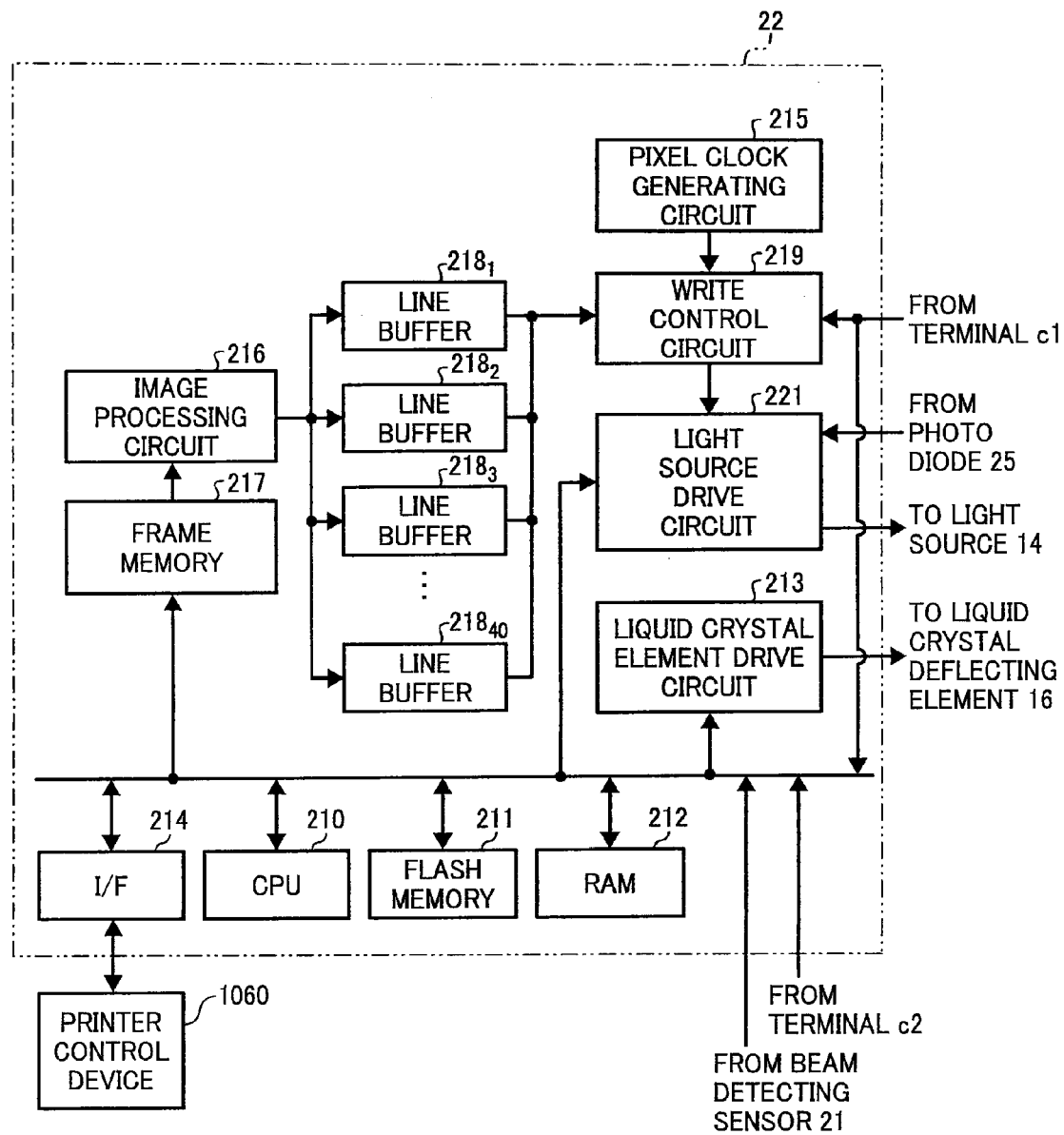
FIG. 11 is a block diagram for explaining a configuration of a scanning control unit of the optical scanning device.

As shown in FIG. 11 as one example, the scanning control unit 22 includes a central processing unit (CPU) 210, a flash memory 211, a random access memory (RAM) 212, a liquid crystal element driving circuit 213, an interface (I/F) 214, a pixel clock generating circuit 215, an image processing circuit 216, a frame memory 217, line buffers $218_1$ to $218_{40}$, a write control circuit 219, and a light source drive circuit 221. The arrows in FIG. 11 indicate representative flows of signals and information, but do not show all the connection relationships of the blocks.

The I/F 214 is a communication interface that controls interactive communication with the printer control device 1060. Image data from upper-level devices is supplied through the I/F 214.

The pixel clock generating circuit 215 generates a pixel clock signal.

The frame memory 217 temporarily stores therein image data rasterized by the CPU 210 (hereinafter, simply called "raster data").

The image processing circuit 216 reads out the raster data stored in the frame memory 217, and performs a predetermined halftone processing and the like, then creates dot data for each light emitting unit, and outputs the dot data to the line buffers $218_1$ to $218_{40}$ corresponding to the respective light emitting units.

The write control circuit 219 obtains the timing of scanning start based on the synchronization detection signal. With the timing of scanning start, the write control circuit 219 reads out the dot data of each light emitting unit from the line buffers $218_1$ to $218_{40}$, superposes the dot data on the pixel clock signal from the pixel clock generating circuit 215, and generates modulated data that is independent for each light emitting unit.

The light source drive circuit 221 drives each light emitting unit of the two-dimensional array 100 according to the modulated data from the write control circuit 219.

Figure 12:
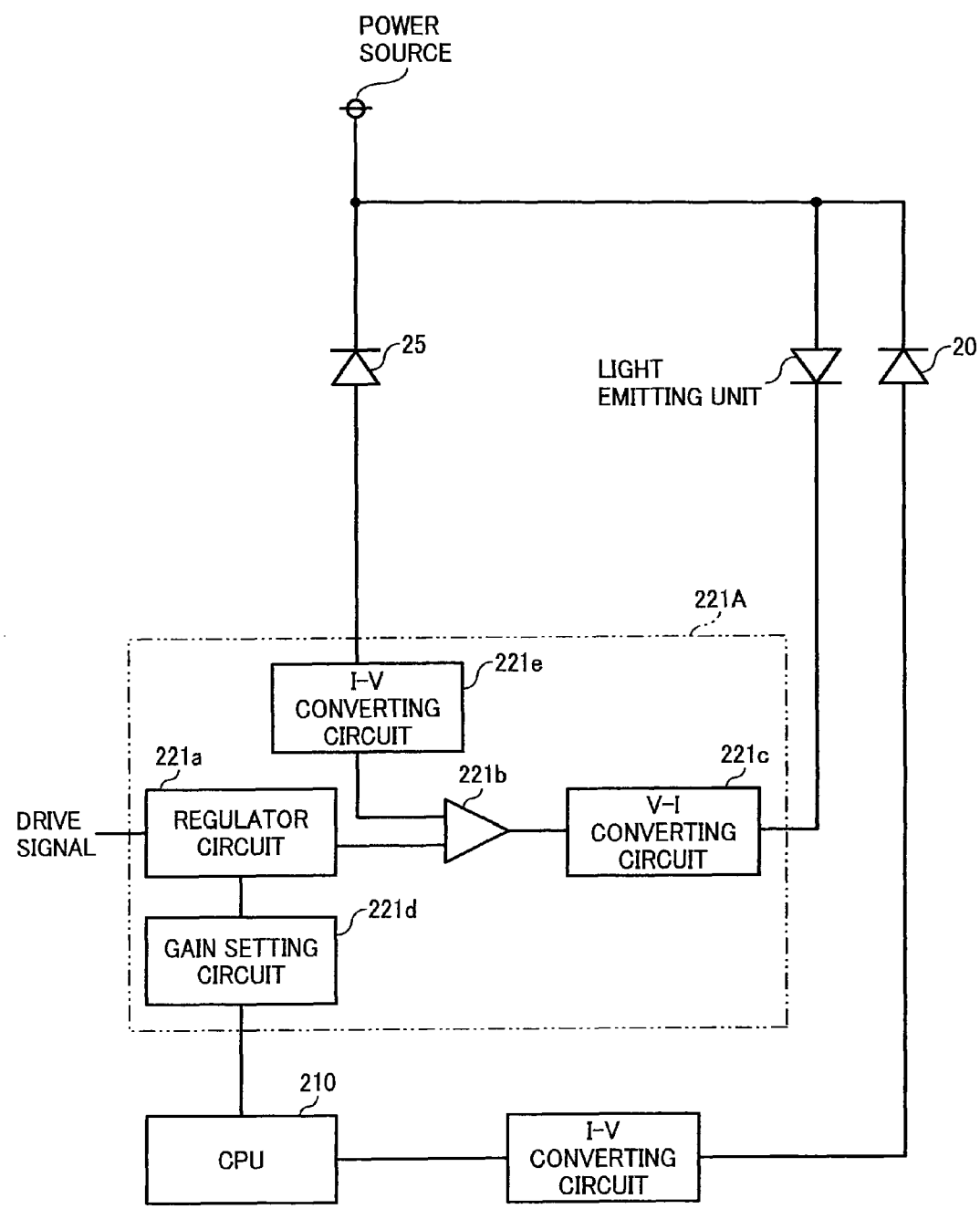
FIG. 12 is a schematic diagram for explaining a drive signal correcting circuit.

As shown in FIG. 12 as one example, the light source drive circuit 221 includes a drive signal correcting circuit 212A that corrects the drive signal. The drive signal correcting circuit 221A includes a regulator circuit 221a, an operational amplifier 221b, a V-I converting circuit 221c, a gain setting circuit 221d, and an I-V converting circuit 221e.

The I-V converting circuit 221e converts an electric current signal from the photo diode 25 to a voltage signal.

The gain setting circuit 221d sets a gain according to an instruction from the CPU 210.

The regulator circuit 221a regulates a drive signal with a gain set by the gain setting circuit 221d.

The operational amplifier 221b outputs a signal such that a difference between a signal output from the I-V converting circuit 221e and a signal output from the regulator circuit 221a is zero.

The V-I converting circuit 221c converts a voltage signal of the operational amplifier 221b to a current signal. The signal output from the V-I converting circuit 221c is output to the light emitting unit.

The flash memory 211 stores therein various computer programs and various data encoded that can be decoded by the CPU 210.

The RAM 212 is a working memory.

The CPU 210 operates in accordance with the computer programs stored in the flash memory 211, and controls the entire operation of the optical scanning device 1010.

For example, the CPU 210 integrates monitor correction signals at each scanning, and when it reaches a predetermined times of scanning N (for example, ten times), the CPU 210 averages the integrated value of the monitor correction signals, and generates a signal for setting a gain in the gain setting circuit 221d based on the average value. The generated signal is output to the gain setting circuit 221d. In other words, every N times of scanning, the regulator circuit 221a sets a gain. The gain is set for each light emitting unit.

Accordingly, the drive signal is controlled based on a signal output from the photo diode 25 and a signal output from the APC light receiving unit 20.

The CPU 210 obtains the deviation amount Δh based on a signal output from the beam detecting sensor 21 at each predetermined timing, and determines voltage applied to the liquid crystal deflecting element 16 such that the positional deviation amount of a light flux on the surface of the photosensitive element 1030 in the sub-scanning direction (hereinafter, "sub-scanning deviation amount" for convenience) becomes almost zero. The relationship between the sub-scanning deviation amount and the applied voltage is obtained in advance, and is stored in the flash memory 211.

The liquid crystal element drive circuit 213 applies the voltage determined by the CPU 210 to the liquid crystal deflecting element 16.

The CPU 210 can obtain the timing of scanning end based on a signal output from the beam detecting sensor 21, and correct the scanning length based on the timing of the scanning end and a synchronization detection signal.

As explained above, the optical scanning device 1010 according to the present embodiment includes: the light source 14; the aperture plate 23 that has the opening the substantial center of which a portion of the light flux that has the highest intensity and is output from the light source 14 passes, and that reflects an incident light flux to the periphery of the opening; the photo diode 25 that receives the light flux reflected by the aperture plate 23; the polygon mirror 13 that deflects the light flux having passed through the opening of the aperture plate 23; the scanning optical system that converges the light flux deflected by the polygon mirror 13 on the surface of the photosensitive element 1030; the APC light receiving unit 20 that receives a part of the light flux deflected by the polygon mirror 13 and heading for the scan start area; the scanning control unit 22 that controls a drive signal of the light source 14 based on a signal output from the photo diode 25 and a signal output from the APC light receiving unit 20.

At least a part of the processing by the CPU 210 according to a computer program can be performed by hardware, or all of the processing can be performed by hardware.

As explained above, in the optical scanning device 1010 according to the present embodiment, the scanning control unit 22 controls a drive signal of the light source 14 based on a signal output from the photo diode 25 and a signal output from the APC light receiving unit 20. Accordingly, even if a divergence angle of a light flux output from the light source 14 changes, the drive signal of the light source 14 can be accurately controlled. Accordingly, APC control can be performed more accurately than that in the conventional art. As a result, stable optical scan of the surface of the photosensitive element 1030 is enabled.

According to the present embodiment, the APC light receiving unit 20 is arranged in the scan start area. Accordingly, the detection of a light amount is enabled in a manner similar to that where image information is written in an image area. Thus, the accuracy of the APC control can be further improved.

According to the present embodiment, the APC light receiving unit 20 is arranged closer to the image area than the forward synchronization detecting sensor 18F is. This facilitates the generating of an emission pattern synchronized with a pixel clock.

According to the present embodiment, voltage applied to the liquid crystal deflecting element 16 is controlled such that the sub-scanning deviation of a light flux on the surface of the photosensitive element 1030 becomes almost zero based on the signal output from the beam detecting sensor 21. Accordingly, light receiving positions at the APC light receiving unit 20 and the forward synchronization detecting sensor 18F are always the same, and thus stable monitor correction signal and synchronization detection signal can be obtained.

According to the present embodiment, the forward synchronization detecting sensor 18F is arranged in the scan start area, and the beam detecting sensor 21 is arranged in the scan end area. Accordingly, the scanning length can be controlled accurately. In other words, the accuracy of a pixel position can be improved.

According to the present embodiment, the amount of light received by the forward synchronization detecting sensor 18F is always almost constant, and thus a stable synchronization detection signal can be obtained.

According to the present embodiment, each of the APC light receiving unit 20 and the forward synchronization detecting sensor 18F includes a dual-split light receiving element, and thus high accuracy can be realized despite the small size.

According to the present embodiment, the APC light receiving unit 20 and the forward synchronization detecting sensor 18F are housed in the package Pk, and thus further space-saving and accuracy-improvement are enabled.

According to the present embodiment, the light source 14 includes a surface-emitting laser array, and thus simultaneous scanning with a plurality of light fluxes is possible.

The laser printer 1000 according to the present embodiment includes the optical scanning device 1010 that can optically scan the surface of the photosensitive element 1030 stably; as a result, the laser printer 1000 can form a high-quality image.

According to the present embodiment, the light source 14 includes a surface-emitting laser array, and thus higher speed image formation and higher write density can be realized.

In the embodiment explained above, the case where the two-dimensional array 100 includes 40 light emitting units is described, but other cases can be conceived.

Figure 13:
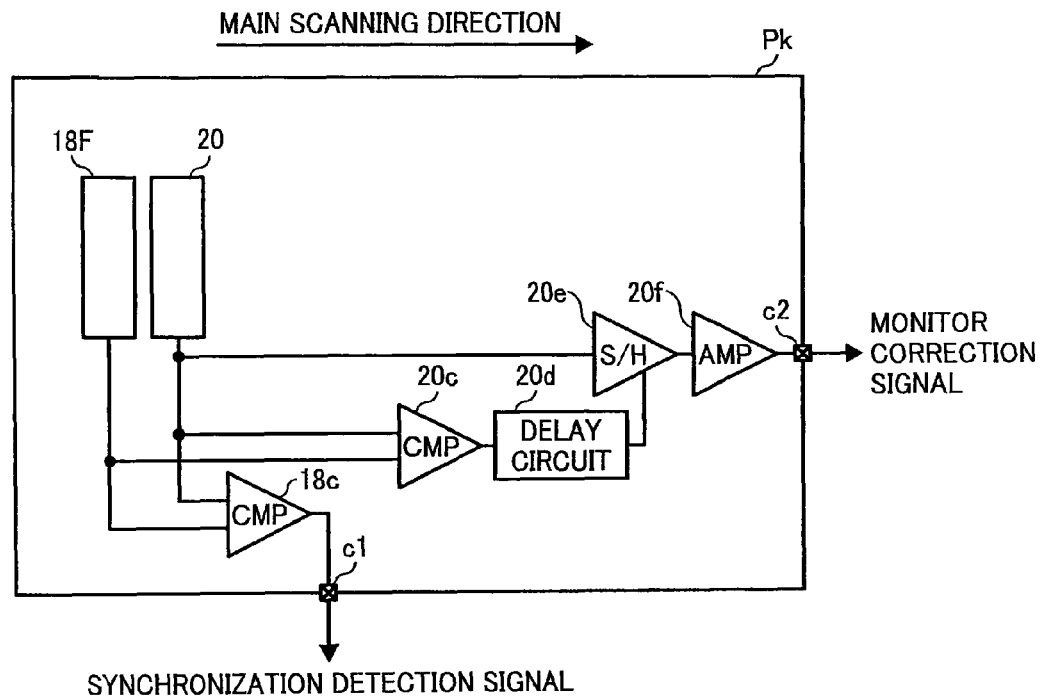
FIG. 13 is a schematic diagram for explaining a first modification of the package.
Figure 14:
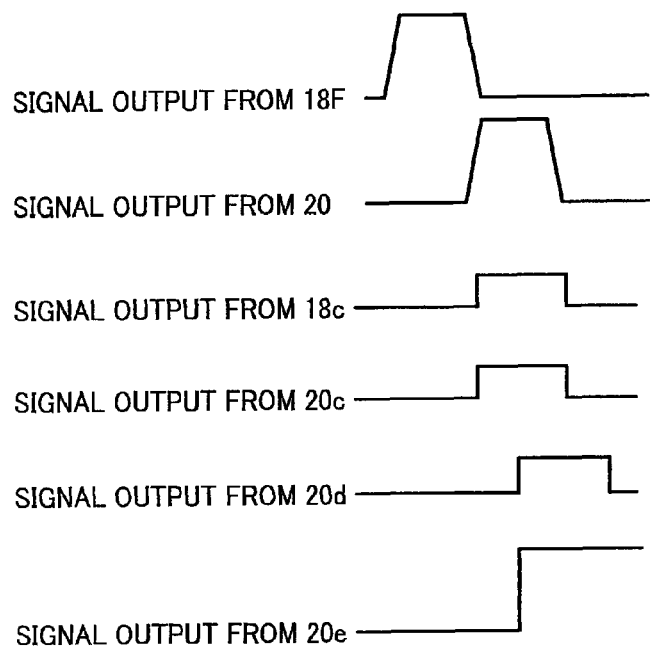
FIG. 14 is a timing chart for explaining the first modification of the package.

In the embodiment explained above, a dual-split light receiving element of each of the forward synchronization detecting sensor 18F and the APC light receiving unit 20 can be a single-body light receiving element (see FIGS. 13 and 14).

In such a case, the comparator 18c compares the signal output from the forward synchronization detecting sensor 18F and the signal output from the APC light receiving unit 20, and the result is output from the terminal c1 of the package Pk as the synchronization detection signal. The comparator 20c compares the signal output from the forward synchronization detecting sensor 18F and the signal output from the APC light receiving unit 20, and the result is input to the delay circuit 20d. The sample-hold circuit 20e samples and holds the signal output from the APC light receiving unit 20 with the signal output from the delay circuit 20d as a sampling signal. The signal output from the sample-hold circuit 20e is amplified by the amplifier 20f, and then output from a terminal c2 of the package Pk as a monitor correction signal.

In this case also, a synchronization detection signal and a monitor correction signal similar to those of the embodiment explained above can be obtained. Accordingly, cost reduction and downsizing are possible.

Figure 15:
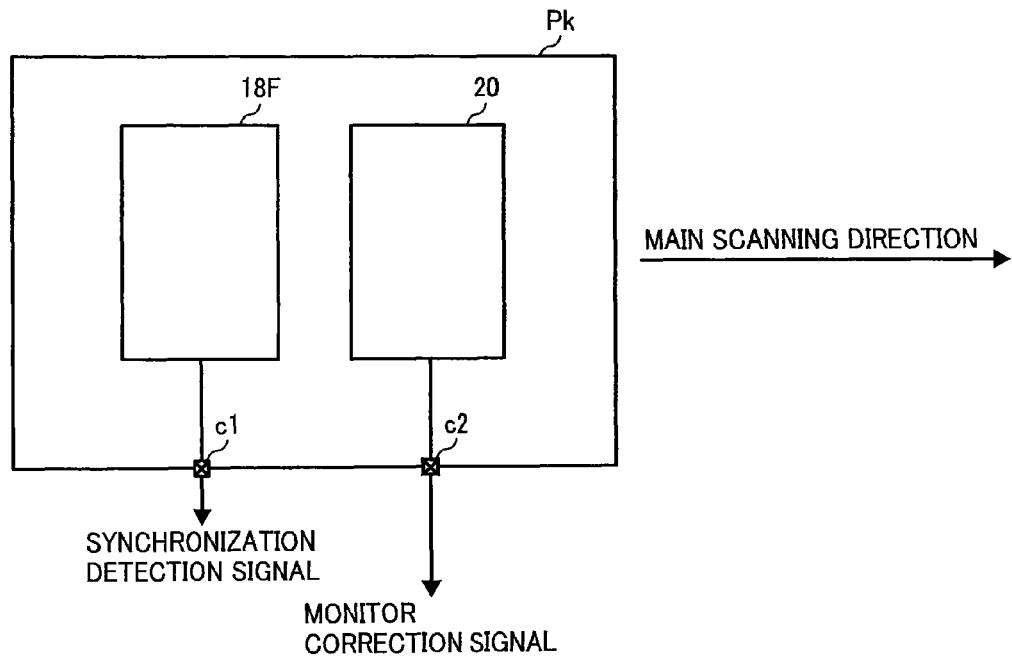
FIG. 15 is a schematic diagram for explaining a second modification of the package.

For example as shown in FIG. 15, the signal output from the forward synchronization detecting sensor 18F can be output from the terminal c1 of the package Pk as the synchronization detection signal. Similarly, the signal output from the APC light receiving unit 20 can be output from the terminal c2 of the package Pk as the monitor correction signal.

Figure 16:
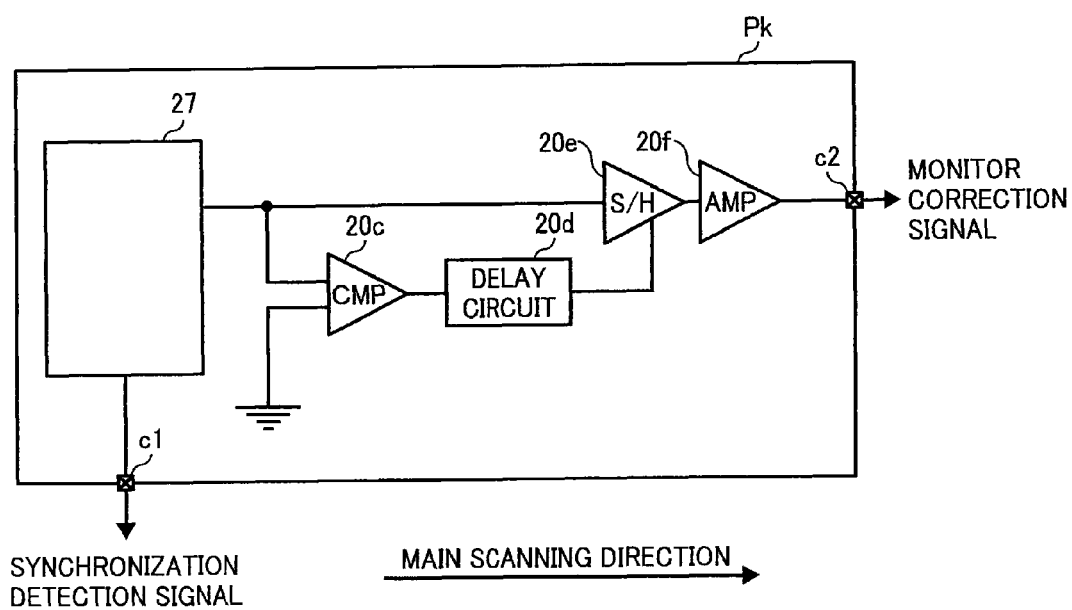
FIG. 16 is a schematic diagram for explaining a third modification of the package.
Figure 17:
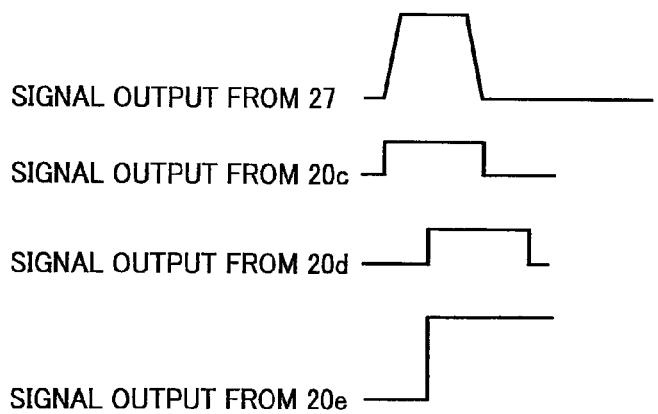
FIG. 17 is a timing chart for explaining the third modification of the package.

Furthermore, for example as shown in FIGS. 16 and 17, the light receiving element of the forward synchronization detecting sensor 18F and the light receiving element of the APC light receiving unit 20 can be a shared light receiving element 27.

A signal output from the light receiving element 27 is output from the terminal c1 of the package Pk as a synchronization detection signal. The comparator 20c compares the signal output from the light receiving element 27 and a ground level, and the result is input to the delay circuit 20d. The sample-hold circuit 20e samples and holds the signal output from the light receiving element 27 with a signal output from the delay circuit 20d as a sampling signal. The signal output from the sample-hold circuit 20e is amplified by the amplifier 20f, and then output from the terminal c2 of the package Pk as a monitor correction signal. This enables further downsizing.

Figure 18:
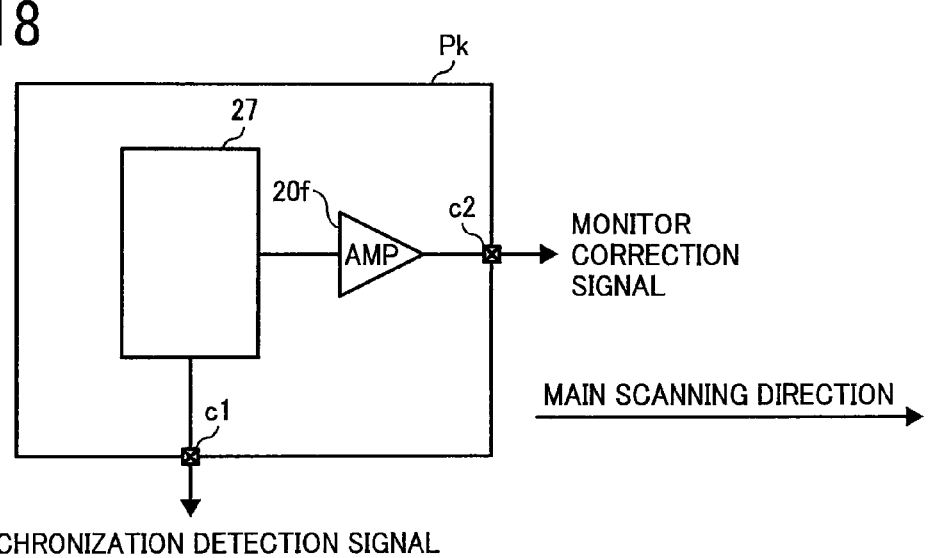
FIG. 18 is a schematic diagram for explaining a fourth modification of the package.

In this case, for example as shown in FIG. 18, the signal output from the light receiving element 27 can be amplified by the amplifier 20f and output from the terminal c2 of the package Pk as a monitor correction signal.

Figure 19:
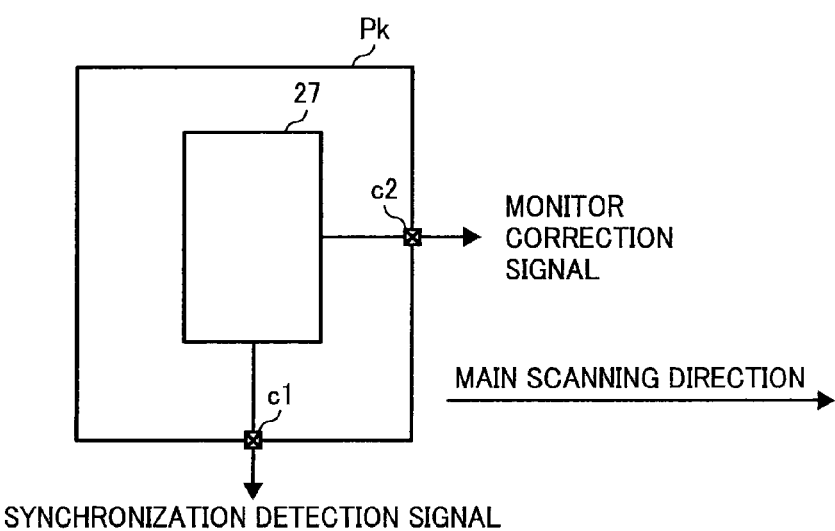
FIG. 19 is a schematic diagram for explaining a fifth modification of the package.

Furthermore, in this case, for example as shown in FIG. 19, the signal output from the light receiving element 27 can be output, without being amplified, from the terminal c2 of the package Pk as a monitor correction signal.

Figure 20:
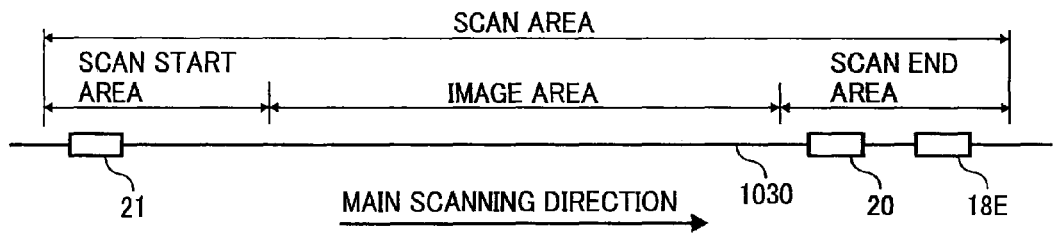
FIG. 20 is a schematic diagram for explaining a first modification of positions where the APC light receiver, the forward synchronization detecting sensor, and the beam detecting sensor are arranged.
Figure 21:
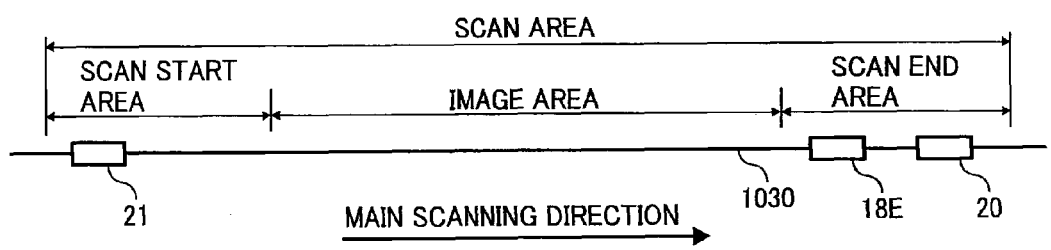
FIG. 21 is a schematic diagram for explaining a second modification of positions where the APC light receiving unit, the forward synchronization detecting sensor, and a beam detecting sensor are arranged.

In the embodiment explained above, for example as shown in FIGS. 20 and 21, the beam detecting sensor 21 can be arranged in the scan start area. In this setting, a backward synchronization detecting sensor 18E and the APC light receiving unit 20 can be arranged in the scan end area.

Figure 22:
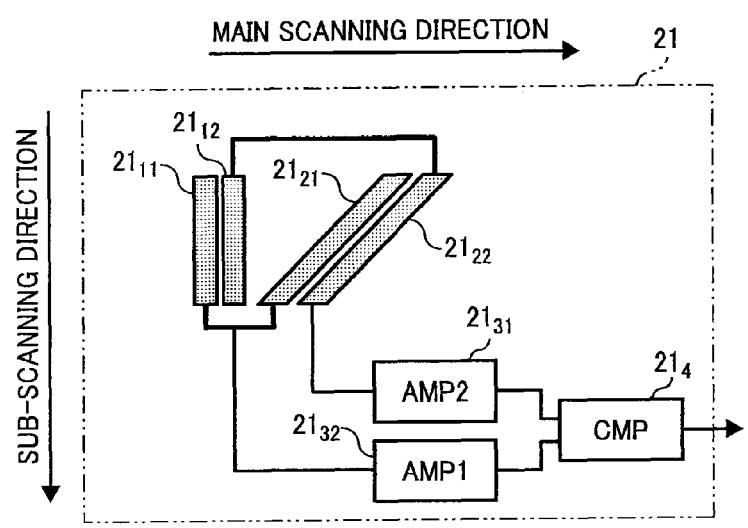
FIG. 22 is a schematic diagram for explaining a first modification of the beam detecting sensor.
Figure 23:
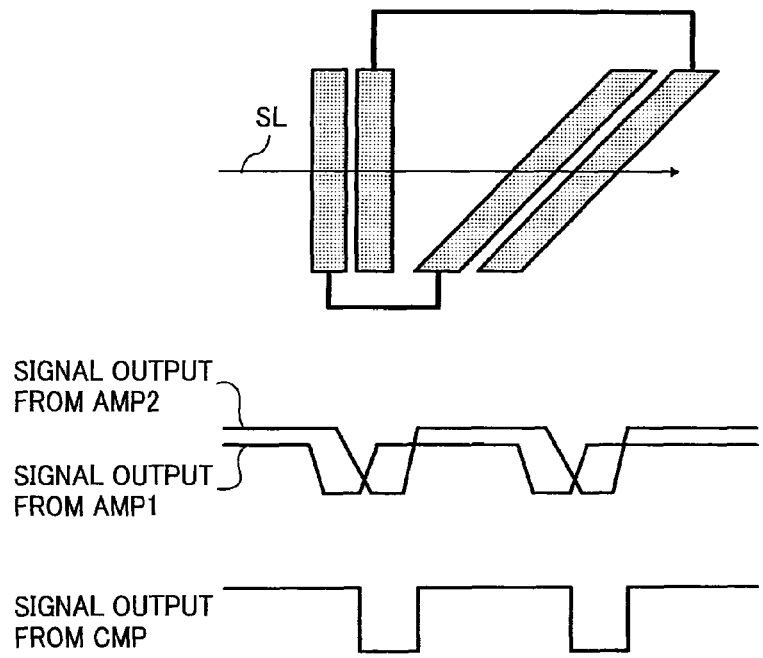
FIG. 23 is another schematic diagram for explaining the first modification of the beam detecting sensor.
Figure 24:
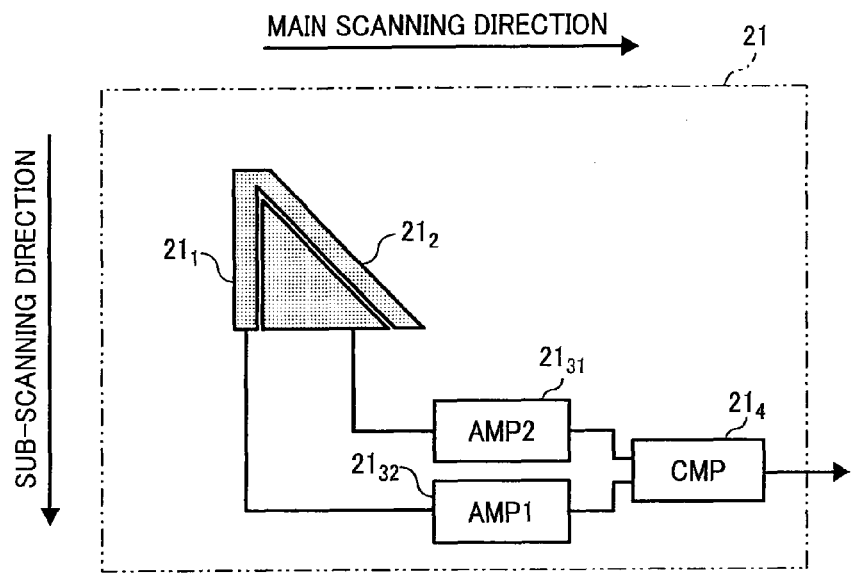
FIG. 24 is a schematic diagram for explaining a second modification of the beam detecting sensor.
Figure 25:
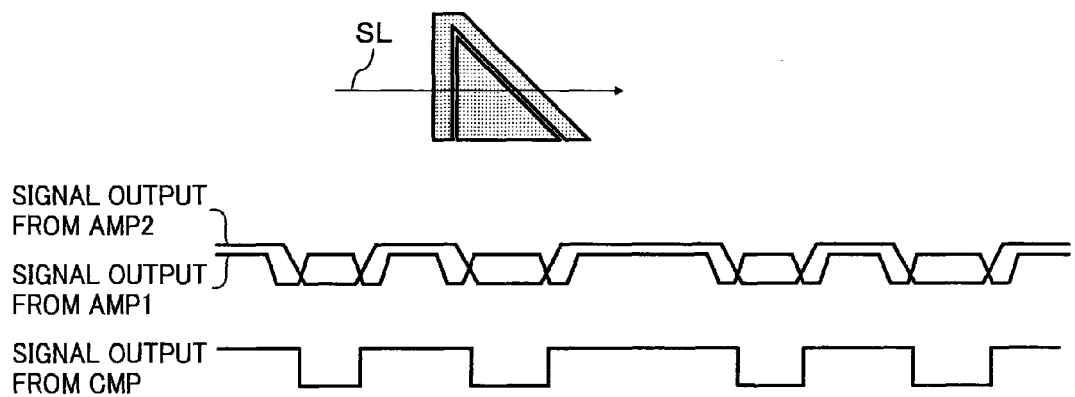
FIG. 25 is another schematic diagram for explaining the second modification of the beam detecting sensor.
Figure 26:
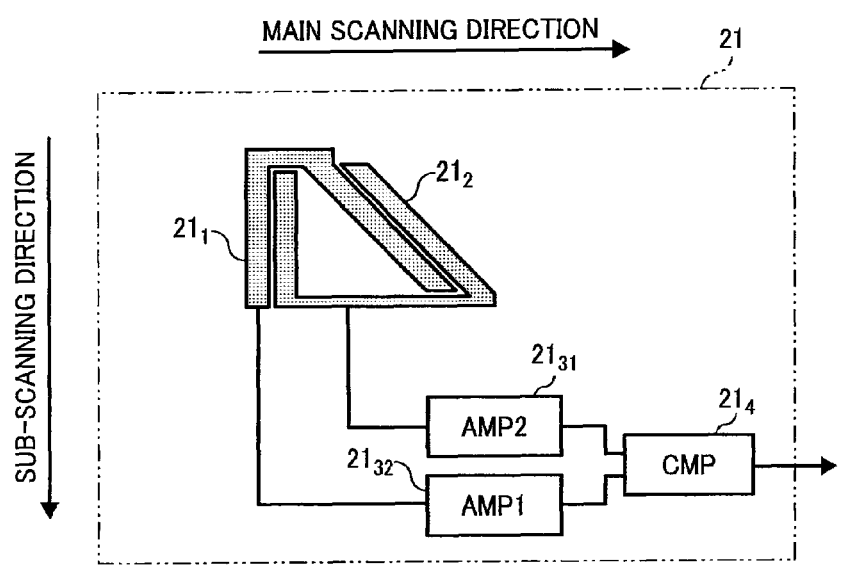
FIG. 26 is a schematic diagram for explaining a third modification of the beam detecting sensor.
Figure 27:
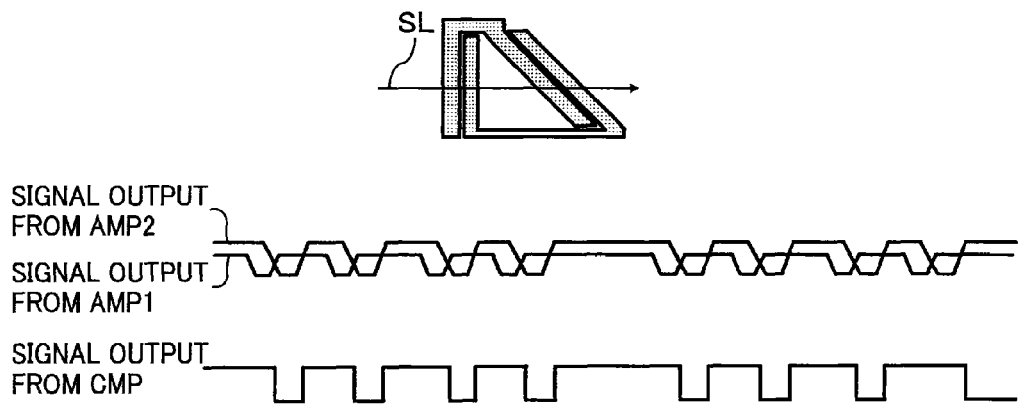
FIG. 27 is another schematic diagram for explaining the third modification of the beam detecting sensor.

In the embodiment explained above, for example as shown in FIGS. 22 and 23, the first light receiving unit $21_1$ can be a dual-split light receiving element of a first light receiving element $21_{11}$ and a second light receiving element 2112, and the second light receiving unit $21_2$ can be a dual-split light receiving element of a first light receiving element $21_{21}$ and a second light receiving element $21_{22}$. Accordingly, high accuracy and further downsizing is realized.

In the embodiment explained above, for example as shown in FIGS. 24 to 27, the first light receiving unit $21_1$ and the second light receiving unit $21_2$ of the beam detecting sensor 21 can have shapes other than rectangle or parallelogram.

Figure 28:
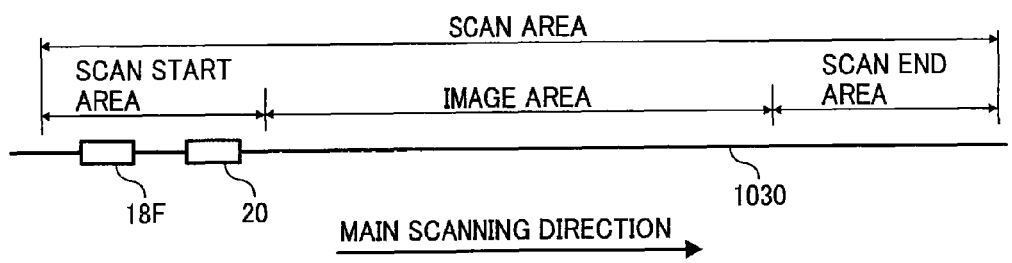
FIG. 28 is a schematic diagram for explaining a case in which only the APC light receiving unit and the forward synchronization detecting sensor are provided near a photosensitive element of the laser printer.
Figure 29:
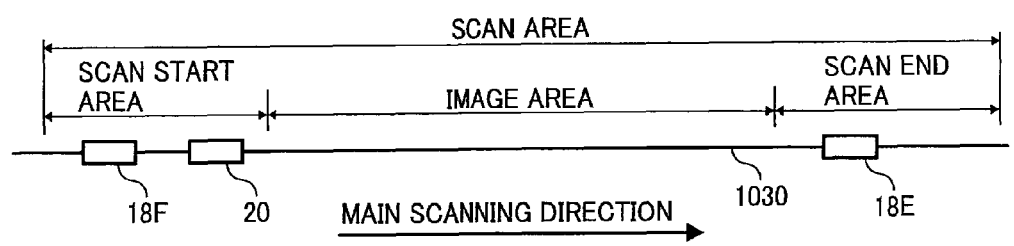
FIG. 29 is a schematic diagram for explaining a case of providing two synchronization detecting sensors.
Figure 30:
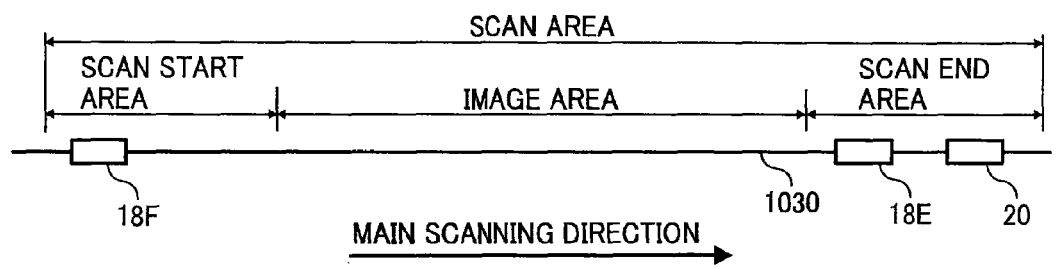
FIG. 30 is a schematic diagram for explaining another case of providing two synchronization detecting sensors.

In the embodiment explained above, when a unit for detecting sub-scanning deviation is separately provided, for example as shown in FIGS. 28 to 30, the beam detecting sensor 21 can be omitted.

In FIG. 28, a case in which the forward synchronization detecting sensor 18F and the APC light receiving unit 20 are arranged in the scan start area is illustrated. In FIG. 29, a case in which the backward synchronization detecting sensor 18E is arranged in the scan end area is illustrated. In FIG. 30, a case in which the forward synchronization detecting sensor 18F is arranged in the scan start area, and the backward synchronization detecting sensor 18E and the APC light receiving unit 20 are arranged in the scan end area is illustrated.

In the embodiment explained above, a case in which a gain is set for every N times of scanning is explained, but alternatively the integrated value of the monitor correction signal during the last N times of scanning can be averaged every time of scanning, and the gain setting circuit 221d can generate a signal to set a gain based on the average value.

In the embodiment explained above, the laser printer 1000 is explained as an example of the image forming apparatus, but the image forming apparatus is not limited to this. Any image forming apparatus that includes the optical scanning device 1010 can form a high quality image.

For example, the image forming apparatus can be the one that directly irradiates, with laser light, a recording medium (for example, paper) that exhibits colors by the laser light.

Alternatively, the image forming apparatus can be the one that uses silver halide film as an image carrier. In this case, a latent image is formed on the silver halide film by optical scanning, and the latent image is developed by processing equivalent to development process in general silver halide photographic process. The image can be transferred onto a photographic paper by process equivalent to printing process in general silver halide photographic process. Such image forming apparatus can be implemented as an optical print-making apparatus or an optical drawing apparatus that draws CT (computed tomographic) scan image or the like.

Figure 31:
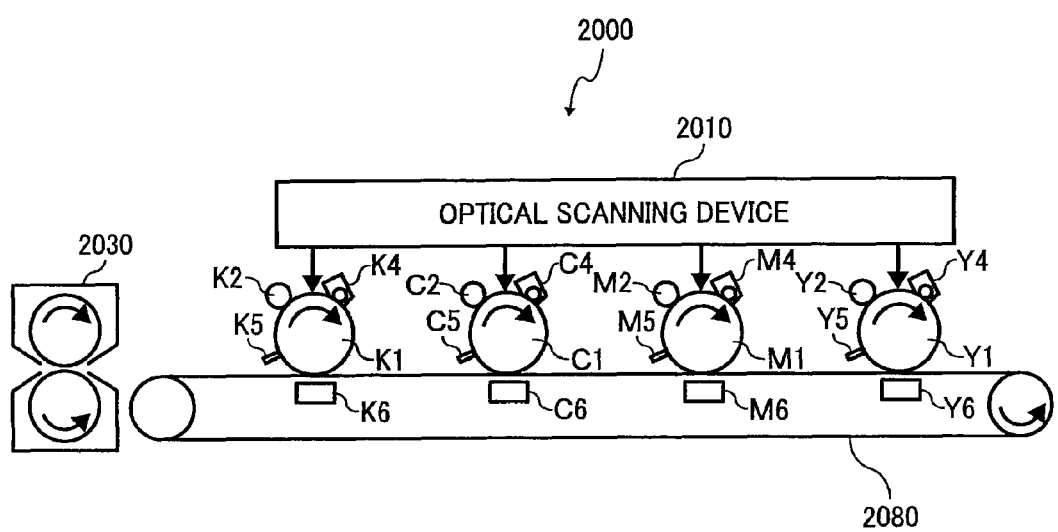
FIG. 31 is a schematic diagram of a configuration of a color printer.

For example as shown in FIG. 31, the image forming apparatus can be a color printer 2000 having a plurality of photosensitive elements.

The color printer 2000 is a tandem system multicolor printer that forms a full color image by superimposing four colors (black, cyan, magenta, and yellow). The color printer 2000 includes: a photosensitive element K1, a charging unit K2, a developing unit K4, a cleaning unit K5, and a transfer unit K6 for black; a photosensitive element C1, a charging unit C2, a developing unit C4, a cleaning unit C5, and a transfer unit C6 for cyan; a photosensitive element M1, a charging unit M2, a developing unit M4, a cleaning unit M5, and a transfer unit M6 for magenta; a photosensitive element Y1, a charging unit Y2, a developing unit Y4, a cleaning unit Y5, and a transfer unit Y6 for yellow; an optical scanning device 2010; a transfer belt 2080, and a fixing unit 2030.

Each photosensitive element rotates in the direction of arrows in FIG. 31. In the periphery of each photosensitive element, a charging unit, a developing unit, a transfer unit, and a cleaning unit are arranged in the rotation order. Each charging unit charges the surface of a corresponding photosensitive element uniformly. The optical scanning device irradiates with light the surface of each photosensitive element charged by the charging unit, so that an electrostatic latent image is formed on each photosensitive element. A corresponding developing unit forms a toner image on the surface of each photosensitive element. A corresponding transfer unit transfers a toner image of each color onto a recording sheet, and finally the fixing unit 2030 fixes an image onto the recording sheet.

The optical scanning device 2010 includes, for each color: a light source similar to the light source 14; a synchronization detecting sensor similar to the forward synchronization detecting sensor 18F; an APC light receiver similar to the APC light receiving unit 20; a beam detecting sensor similar to the beam detecting sensor 21; a photo diode similar to the photo diode 25; a pre-deflector optical system similar to the above-described pre-deflector optical system; and a scanning optical system similar to the above-described scanning optical system. The components similar to those of the optical scanning device 1010 are given the same numerals for description.

Figure 32:
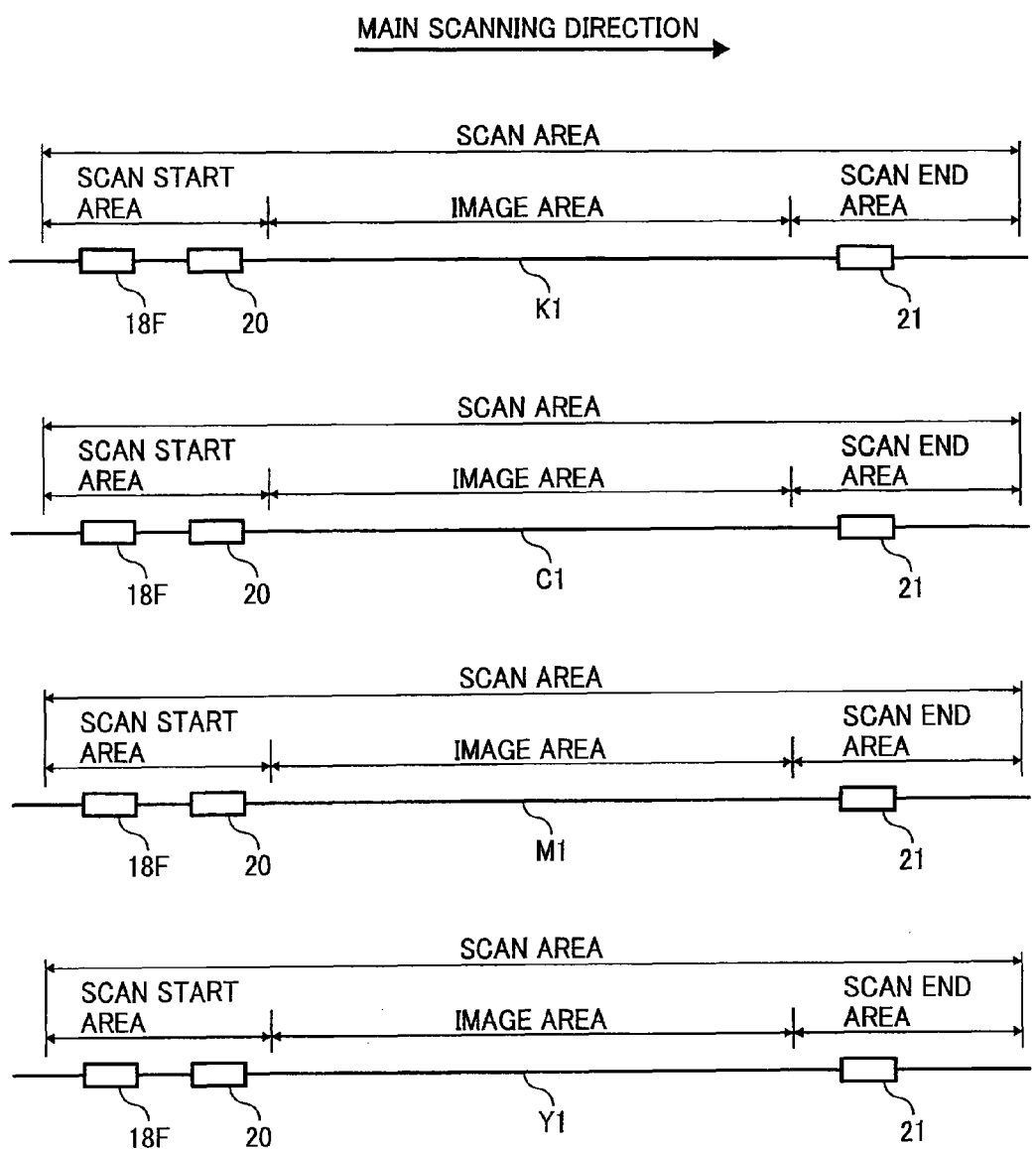
FIG. 32 is a schematic diagram for explaining positions where the APC light receiver, the forward synchronization detecting sensor, and the beam detecting sensor shown in FIG. 31 are arranged.

For example as shown in FIG. 32, the forward synchronization detecting sensor 18F and the APC light receiving unit 20 are arranged in the scan start area of each photosensitive element, and the beam detecting sensor 21 is arranged in the scan end area of each photosensitive element.

A light flux output from each light source 14 is deflected by a common polygon mirror after passing through a corresponding pre-deflector optical system, and passes through a corresponding scanning optical system, then, is applied to a corresponding photosensitive element.

The light flux reflected by the aperture plate 23 of each pre-deflector optical system is received by a corresponding photo diode 25.

After being deflected by the polygon mirror and having passed through each scanning optical system, a part of the light flux heading for the scan start area enters a corresponding forward synchronization detecting sensor 18F and a corresponding APC light receiving unit 20.

After being deflected by the polygon mirror and passing through each scanning optical system, a part of the light flux heading for the scan end area enters a corresponding beam detecting sensor 21.

The optical scanning device 2010 includes a scanning control unit. The scanning control unit controls, for each color, a drive signal of a corresponding light source 14 based on a signal output from a corresponding photo diode 25 and a signal output from a corresponding APC light receiving unit 20. In other words, the scanning control unit performs APC control of each light source 14 similarly to the optical scanning device 1010. Accordingly, APC control can be performed more accurately than in the conventional art. As a result, the color printer 2000 can form a high quality color image.

The color printer 2000 can include, for each color, the optical scanning device 1010 instead of the optical scanning device 2010.

According to one aspect of the present invention, a light flux output from a light source and reflected by a reflecting optical unit is received by a first light receiving unit. A light flux output from the light source and having passed through an opening of the reflecting optical unit is deflected by a deflecting unit, and is converged on a scan target surface after passing through a scanning optical system. Of among the light flux deflected by the deflecting unit, a part of the light flux heading for outside an image area within the scan area is received by a second light receiving unit. A control unit controls a drive signal of the light source based on a signal output from the first light receiving and a signal output from the second light receiving unit. Even if the divergence angle of a light flux output from the light source changes, the drive signal of the light source can be accurately controlled. Accordingly, APC control can be performed more accurately than in the conventional art.

According to another aspect of the present invention, because the image forming apparatus includes at least one optical scanning device described above, a high quality image can be formed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   at least one image carrier on which an image is formed; and
   an optical scanning device that scans a scan area on the image carrier with a light flux containing image information and writes the image information onto an image area in the scan area, and that includes
   a light source that emits a light flux;
   a reflecting optical unit that has an aperture through a substantial center of which a first light flux of the light flux having the highest light intensity passes, and that reflects a second light flux of the light flux incident on a periphery of the aperture;
   a first light receiving unit that receives the second light flux reflected by the reflecting optical unit;
   a deflecting unit that deflects the first light flux having passed through the aperture;
   a scanning optical unit that converges the first light flux deflected by the deflecting unit on the image carrier;
   a second light receiving unit that receives a part of the first light flux deflected by the deflecting unit and heading for outside the image area within the scan area; and
   a control unit that controls a drive signal of the light source to control the output level of the light source by comparing a signal output from the first light receiving unit and a signal output from the second light receiving unit.

2. The image forming apparatus according to claim 1, wherein the second light receiving unit is arranged outside the image area within the scan area.

3. The image forming apparatus according to claim 2, wherein the second light receiving unit is arranged on a scanning start side with respect to the image area.

4. The image forming apparatus according to claim 3, further comprising a third light receiving unit that is arranged in the scan area and on the scanning start side with respect to the second light receiving unit.

5. The image forming apparatus according to claim 4, wherein an amount of a light flux that enters the third light receiving unit is constant.

6. The image forming apparatus according to claim 5, wherein an amount of light flux that enters the second light receiving unit is different from the amount of light flux that enters the third light receiving unit.

7. The image forming apparatus according to claim 4, further comprising a fourth light receiving unit that is arranged on a scanning end side with respect to the image area within the scan area.

8. The image forming apparatus according to claim 4, further comprising a beam detecting unit that is arranged on a scanning end side with respect to the image area within the scan area, that detects positional deviation of the first light flux converged on the image carrier, in the sub-scanning direction, and that includes a light receiving unit including a first light receiving element and a second light receiving element, wherein
- a light receiving plane of each of the first light receiving element and the second light receiving element is scanned with the first light flux in the main scanning direction,
- at least one side of the first light receiving element over which the first light flux passes is orthogonal to the main scanning direction, and
- at least one side of the second light receiving element over which the first light flux passes is inclined to both the main scanning direction and the sub-scanning direction.

9. The image forming apparatus according to claim 8, wherein the first light receiving element is arranged closer to a scanning start position than the second light receiving element.

10. The image forming apparatus according to claim 8, wherein each of the third light receiving unit and the beam detecting unit includes a dual-split light receiving element.

11. The image forming apparatus according to claim 4, wherein the second light receiving unit and the third light receiving unit are integrated to be a shared light receiving element.

12. The image forming apparatus according to claim 2, wherein the second light receiving unit is arranged on a scanning end side with respect to the image area, 13. The image forming apparatus according to claim 12, further comprising a third light receiving unit that is arranged between the second light receiving unit and the image area.

14. The image forming apparatus according to claim 13, wherein an amount of a light flux that enters the third light receiving unit is constant.

15. The image forming apparatus according to claim 14, wherein an amount of light flux that enters the second light receiving unit is different from the amount of light flux that enters the third light receiving unit.

16. The image forming apparatus according to claim 13, further comprising a fourth light receiving unit that is arranged on a scanning start side with respect to the image area within the scan area.

17. The image forming apparatus according to claim 13, further comprising a beam detecting unit that is arranged on a scanning start side with respect to the image area within the scan area, that detects positional deviation of the first light flux converged on the image carrier, in the sub-scanning direction, and that includes a light receiving unit including a first light receiving element and a second light receiving element, wherein
- a light receiving plane of each of the first light receiving element and the second light receiving element is scanned with the first light flux in the main scanning direction,
- at least one side of the first light receiving element over which the first light flux passes is orthogonal to the main scanning direction, and
- at least one side of the second light receiving element over which the first light flux passes is inclined to both the main scanning direction and the sub-scanning direction.

18. The image forming apparatus according to claim 17, wherein the first light receiving element is arranged closer to a scanning start position than the second light receiving element.

19. The image forming apparatus according to claim 17, wherein each of the third light receiving unit and the beam detecting unit includes a dual-split light receiving element.

20. The image forming apparatus according to claim 13, wherein the second light receiving unit and the third light receiving unit are integrated to be a shared light receiving element.

21. The image forming apparatus according to claim 1, wherein the light source includes a plurality of light emitting units arrayed two-dimensionally.

* * * * *